United States Patent
De Col et al.

(10) Patent No.: US 12,325,201 B2
(45) Date of Patent: Jun. 10, 2025

(54) METHOD AND APPARATUS FOR APPLYING RUBBERIZED ELECTRONIC TAGS TO A TYRE BEING PROCESSED

(71) Applicant: PIRELLI TYRE S.P.A., Milan (IT)

(72) Inventors: Christian De Col, Milan (IT); Alessandro Davario, Milan (IT); Damiano Martin, Milan (IT); Jury De Col, Milan (IT)

(73) Assignee: PIRELLI TYRE S.P.A., Milan (IT)

( * ) Notice: Subject to any disclaimer, the term of this patent is extended or adjusted under 35 U.S.C. 154(b) by 274 days.

(21) Appl. No.: 18/246,176

(22) PCT Filed: Oct. 25, 2021

(86) PCT No.: PCT/IB2021/059816
§ 371 (c)(1),
(2) Date: Mar. 21, 2023

(87) PCT Pub. No.: WO2022/090889
PCT Pub. Date: May 5, 2022

(65) Prior Publication Data
US 2023/0364872 A1 Nov. 16, 2023

(30) Foreign Application Priority Data
Oct. 30, 2020 (IT) .................. 102020000025825

(51) Int. Cl.
*B29D 30/00* (2006.01)
(52) U.S. Cl.
CPC .. *B29D 30/0061* (2013.01); *B29D 2030/0077* (2013.01); *Y10T 156/1195* (2015.01); *Y10T 156/1978* (2015.01)

(58) Field of Classification Search
CPC ........ B29D 30/0061; B29D 2030/0077; B29D 2030/0072; Y10T 156/1195; Y10T 156/1978
See application file for complete search history.

(56) References Cited

U.S. PATENT DOCUMENTS 5,264,066 A * 11/1993 Lundell ..................... B65C 3/00
156/542
5,895,552 A * 4/1999 Matsuguchi .......... B65C 9/1803
156/499

(Continued)

FOREIGN PATENT DOCUMENTS

CN 105121144 A 12/2015
CN 206307383 U 7/2017

(Continued)

OTHER PUBLICATIONS

Chinese Office Action issued for CN Application No. 202180072020.8 filed on Oct. 25, 2021 on behalf of Pirelli Tyre S.P.A. Issue Date: Dec. 14, 2023. (English translation and Original) 9 Pages.

(Continued)

*Primary Examiner* — George R Koch
*Assistant Examiner* — Christopher C Caillouet
(74) *Attorney, Agent, or Firm* — Steinfl + Bruno LLP

(57) ABSTRACT

A method for applying rubberized electronic tags to a tyre being processed. A continuous band is extended lengthwise along a longitudinal direction. The rubberized electronic tags are adhered to the front surface of the band and arranged sequentially along that direction. A rubberized electronic tag is peeled from the continuous band and applied to the tyre. The peeling includes imposing a longitudinal sliding motion and a sliding path on the band.

20 Claims, 9 Drawing Sheets

(56) References Cited

U.S. PATENT DOCUMENTS

| | | | |
|---|---|---|---|
| 7,176,799 B1 * | 2/2007 | Golicz | G06K 19/077 400/621 |
| 11,040,509 B2 | 6/2021 | Conti | |
| 2005/0274269 A1 | 12/2005 | Nishimoto et al. | |
| 2021/0268760 A1 | 9/2021 | Conti | |

FOREIGN PATENT DOCUMENTS

| | | |
|---|---|---|
| CN | 107000350 A | 8/2017 |
| EP | 0517062 A1 | 12/1992 |
| EP | 1504881 A1 | 2/2005 |
| WO | 00/26093 A1 | 5/2000 |
| WO | 2014/155240 A1 | 10/2014 |
| WO | 2016/097970 A1 | 6/2016 |
| WO | 2016/116834 A1 | 7/2016 |

OTHER PUBLICATIONS

International Search Report and Written Opinion issued for International PCT Application No. PCT/IB2021/059816 filed on Oct. 25, 2021 on behalf of Pirelli Tyre S.P.A. Mail Date: Feb. 25, 2022. 8 pages.

* cited by examiner

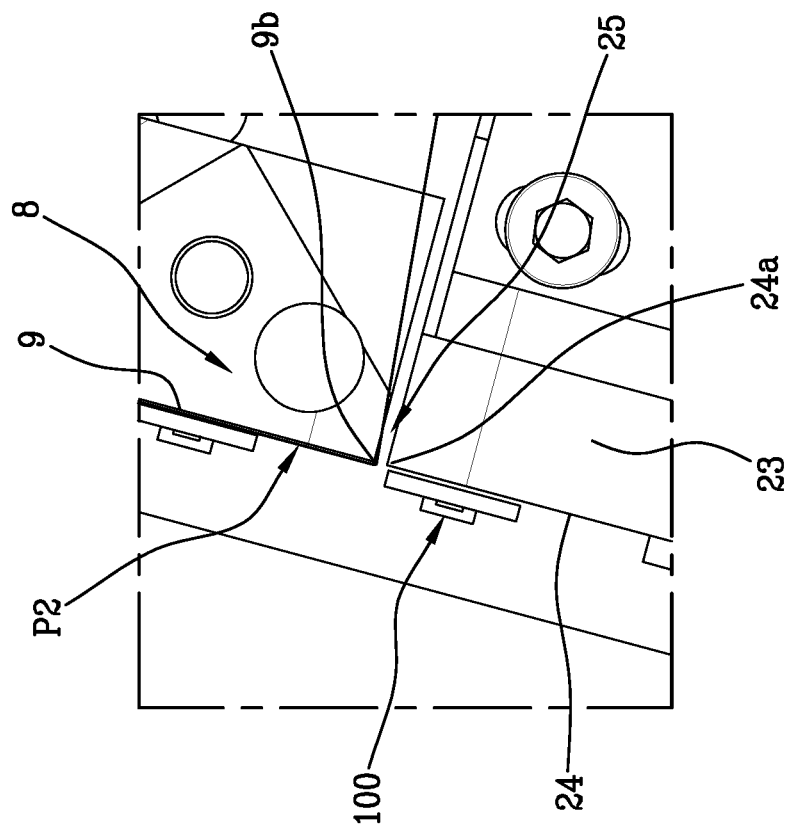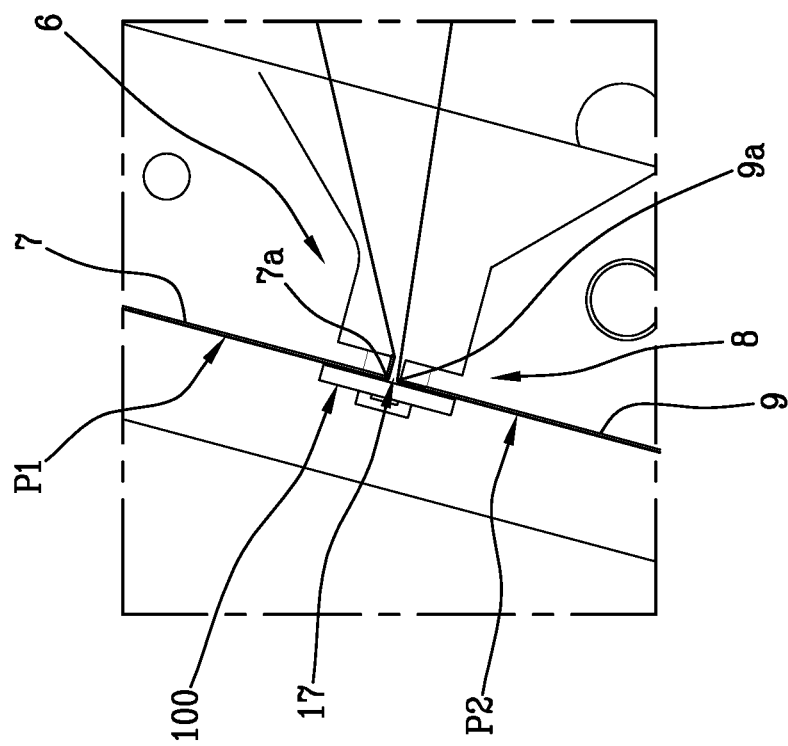

METHOD AND APPARATUS FOR APPLYING RUBBERIZED ELECTRONIC TAGS TO A TYRE BEING PROCESSED

CROSS-REFERENCE TO RELATED APPLICATIONS

The present application is the U.S. National Stage of International Patent Application No. PCT/IB2021/059816 filed on Oct. 25, 2021, which, in turn, claims priority to Italian Patent Application No. 102020000025825 filed on Oct. 30, 2020.

The present invention refers to a method and an apparatus for applying rubberized electronic tags to a tyre being processed.

The present invention is directed in particular towards the field of tyre building, where in recent years the technology of radiofrequency identification and/or storage (RFID) has found application for monitoring both the production and the lifetime of the tyre itself.

With the term "tyre being processed" it is intended the set of one or more parts of the green tyre built on a forming support, including the green tyre.

With the term "rubberized electronic tag" it is intended a unit for storing data of a contactless identification and/or storage system, in particular a transponder of a radiofrequency identification and/or storage (RFID) system, applied or embedded in a thin layer of rubber.

With the term "continuous band" it is intended an elongated strip which is extended mainly lengthwise along a longitudinal direction thereof and with negligible thickness with respect to the other two dimensions.

With the term "front surface" or "rear surface" of the continuous band it is intended the surface of greater extension of the continuous band, which is extended lengthwise for the entire length of the continuous band and has width equal to that of the continuous band itself.

With the term "sliding path" it is intended the progression set to the continuous band which coincides with the form taken by the continuous band itself.

With the term "longitudinal sliding motion" it is intended an advancing motion of the continuous band along its longitudinal direction.

With the term "sliding speed" it is intended a vector which represents the spot speed of the continuous band along the sliding path.

With the term "transition line" it is intended a zone of the sliding path corresponding to a variation of the direction of the sliding speed.

With the expressions "downstream" and "upstream", reference is made to the aforesaid longitudinal sliding motion. Therefore, assuming for example a longitudinal sliding motion from left to right, a position "downstream" with respect to any one reference element indicates a position to the right of said reference element and a position "upstream" indicates a position to the left of said reference element.

With the term "partial reversal of the sliding speed" with respect to a transition line it is intended a variation of the direction of the sliding speed such that the sliding speed downstream of the transition line has at least one component opposite the sliding speed upstream of the transition line.

RFID technology is substantially based on the use of an electronic tag or transponder, i.e. a chip provided with an antenna, and with a reader of the data contained in the electronic tag. The main advantage is given by the fact that this is a physical or visual contactless identification and/or storage technology.

In the field of tyres, one or more electronic tags can be applied to a tyre being processed so as to control the entire life cycle thereof, from the building to the use by the final user. In some cases, one speaks of "intelligent tyres" capable of collecting the use data and of dialoguing with the car control systems (ABS, ESP).

The document WO00/26093 describes an apparatus for applying self-adhesive tags on a surface which is movable with respect to the apparatus. The tag is brought onto an elongated support belt having a plurality of tags adhered to one side thereof in a longitudinally spaced relationship. The apparatus comprises an edge around which the belt is pulled so that, when a force is applied along the belt that exceeds a peeling threshold, the belt is detached from the tag and the tag is dispensed on the edge. The apparatus comprises pressing means situated at a pre-established distance from the edge in order to press the tag against the surface while it is dispensed, making the tag adhere to the surface, and means for applying a peeling force greater than the peeling threshold during the dispensing of at least one initial portion of the tag.

The document CN206307383U describes an apparatus for automatically tagging tyres which has a device for peeling the tags from a belt. The belt slides first in the direction of the external lateral surface 141a and then traverses the empty space in the direction of the internal lateral surface 141b. The angle between the external lateral surface 141a and the internal surface 141b is an acute angle. The belt is flexible and the hardness of the tags is higher than the belt, so that when the belt is rotated from the external lateral surface 141a to the internal lateral surface 141b, the tag is automatically detached from the belt.

For applying the electronic tags to the tyres, the use of rubberized electronic tags is provided, i.e. where the electronic part is applied or embedded in a thin layer of rubber.

The Applicant has perceived that the step of providing the rubberized electronic tags during the building of the tyre can negatively affect the production cycle time, adding structural complications to the plant and increasing the bulk thereof.

The Applicant has confirmed that it is possible to partly overcome the aforesaid drawbacks by providing the rubberized electronic tags adhered to a continuous band of service material and by subjecting the continuous band to a longitudinal sliding motion, for example by unwinding it from a reel.

The Applicant has also perceived that the needs of the present automated building plants require an efficient automated management of the detachment of the rubberized electronic tags from the continuous band and consequent application to the tyre being processed.

The Applicant has observed that the application of the teaching of the documents WO00/26093 and CN206307383U, in order to achieve an automated detachment of the rubberized electronic tags, generates further drawbacks which make the detachment itself ineffective. Indeed, the Applicant has observed that the rubberized electronic tags are very light, flexible, thin, particularly sticky and having discontinuities, and that due to these characteristics the rubberized electronic tags tend to follow the continuous band even if a sudden change of direction of the continuous band is provided, for example obligating it to rotate around an edge, as in the aforesaid abovementioned documents.

The Applicant has also observed that such phenomenon is further worsened if the rubberized electronic tags have a main dimension arranged transverse to the longitudinal direction of the continuous band (an arrangement which would facilitate compactness of the equipment, and greater efficiency of the apparatuses co-involved due to the number of necessary reel changes), since, even if gradual, the area initially affected by the separation is that under the main size of the rubberized electronic tag.

The Applicant has therefore found that the trend of rubberized electronic tags to follow the continuous band can be limited by using a recirculation section of the continuous band arranged between a first flat abutment surface and a second flat abutment surface. In this manner, the rubberized electronic tags which, at the first flat abutment surface, are found adhered to the continuous band, with a first adhesion force they are gradually detached therefrom in the passage from the first flat abutment surface to the second flat abutment surface and continue without jamming since they adhere with a second adhesion force to the continuous band that transits on the second flat abutment surface arriving from the recirculation section. Since the second adhesion force is smaller than the first adhesion force, the detachment force necessary for definitively moving the rubberized electronic tags away from the continuous band at the second flat abutment surface is smaller than that which would be necessary to apply at the first flat abutment surface.

In accordance with a first aspect, the present invention refers to a method for applying rubberized electronic tags to a tyre being processed.

Preferably provision is made for arranging a continuous band and a plurality of rubberized electronic tags.

Preferably the continuous band is extended lengthwise along a longitudinal direction and has a front surface and a rear surface.

Preferably the rubberized electronic tags are adhered with a first adhesion force to the front surface of the continuous band and are arranged sequentially along the longitudinal direction of the continuous band itself.

Preferably provision is made for peeling a rubberized electronic tag from the continuous band.

Preferably provision is made for applying to a tyre being processed said rubberized electronic tag peeled from the continuous band.

Preferably the action of peeling said rubberized electronic tag from the continuous band comprises imposing, on said continuous band a longitudinal sliding motion having a sliding speed with direction parallel to said longitudinal direction.

Preferably the action of peeling said rubberized electronic tag from the continuous band comprises imposing, on said sliding continuous band, a sliding path comprising at least a first flat section, a recirculation section and a second flat section.

Preferably the first flat section terminates at a first transition line. Preferably the recirculation section starts at the first transition line and terminates at a second transition line parallel and adjacent to the first transition line to form a passage gap for the continuous band.

Preferably the second flat section starts at the second transition line.

Preferably, along the first flat section, the rear surface of the continuous band slides in abutment against a first flat abutment surface with sliding speed parallel to said first flat abutment surface.

Preferably, in the passage from the first flat section to the recirculation section, the rear surface of the continuous band is wound around a first edge delimiting the first flat abutment surface and defining the first transition line so that the direction of the sliding speed of the continuous band undergoes a first rotation.

Preferably, in the passage from the recirculation section to the second flat section, the rear surface of the continuous band is wound around a second edge delimiting a second flat abutment surface defining the second transition line so that the direction of the sliding speed of the continuous band undergoes a second rotation.

Preferably, along the second flat section, the rear surface of the continuous band slides in abutment against the second flat abutment surface with sliding speed parallel to said second flat abutment surface.

Preferably, following said first rotation at the first transition line the rubberized electronic tags are gradually peeled from the continuous band, which continues without rubberized electronic tags along the recirculation section, and continue starting from the second transition line along the second flat section adhering with a second adhesion force, smaller than the first adhesion force, to the front surface of the continuous band which is moving along the second flat section arriving from the recirculation section.

Preferably the action of peeling said rubberized electronic tag from the continuous band comprises overcoming downstream of the second transition line the second adhesion force, in order to definitively move the rubberized electronic tags away from the continuous band.

In accordance with a second aspect the present invention refers to an apparatus for applying rubberized electronic tags to a tyre being processed.

Preferably provision is made for a peeling device configured for peeling a rubberized electronic tag from a continuous band.

Preferably provision is made for an application device configured for applying, to a tyre being processed, said rubberized electronic tag peeled from the continuous band.

Preferably said peeling device comprises a set of transmissions defining a sliding path for a continuous band, said continuous band extended lengthwise along a longitudinal direction and having a front surface and a rear surface.

Preferably said peeling device comprises an inlet section configured for being traversed, at the entrance to the sliding path, by the continuous band carrying a plurality of rubberized electronic tags adhered with a first adhesion force to the front surface of the continuous band and placed sequentially along the longitudinal direction of the continuous band itself.

Preferably said peeling device comprises an outlet section configured for being traversed, at the outlet from the sliding path, by the continuous band lacking rubberized electronic tags.

Preferably said peeling device comprises driving members configured for imposing, on said continuous band, a longitudinal sliding motion along said sliding path with a sliding speed with direction parallel to said longitudinal direction.

Preferably said set of transmissions comprises at least a first abutment body having a first flat abutment surface adapted to abuttingly receive the rear surface of the continuous band and defining a first flat section of the sliding path.

Preferably said set of transmissions comprises at least a second abutment body having a second flat abutment surface adapted to abuttingly receive the rear surface of the continuous band and defining a second flat section of the sliding path.

Preferably a first edge delimiting downstream the first flat abutment surface is parallel to a second edge delimiting upstream the second flat abutment surface and adjacent thereto to form a passage gap for the continuous band.

Preferably said set of transmissions comprises at least a recirculation transmission operatively interposed between the first abutment body and the second abutment body and defining a recirculation section of the sliding path along which the continuous band coming from the first abutment body is first deflected by rotating the direction of the sliding speed of the continuous band and subsequently directed towards said second abutment body.

The Applicant deems that, due to the passage from a first flat abutment surface to a second flat abutment surface and to the corresponding recirculation of the continuous band, the rubberized electronic tags are guided in a manner such to allow an automated peeling without damaging the continuous band or the same rubberized electronic tags. Indeed, the rubberized electronic tags does not sustain deformations, remaining constantly in abutment against flat surfaces, independent of their orientation on the continuous band. Therefore, due to the above indicated characteristics, it is possible to use reels of continuous band, to which the rubberized electronic tags are adhered, with main size thereof perpendicular to the longitudinal direction of the continuous band itself. The use of such reels in fact appears advantageous, as mentioned above, both from the standpoint of the limited deformation set on the rubberized electronic tags and regarding the number of rubberized electronic tags given the same bulk of the reel, positively affecting both the layout of the apparatus and of the same tyre building plant, and the cycle time, being subject to less interruptions for changing the reel. A greater capacity for rubberized electronic tags on the reel also allows obtaining greater efficiency in the preparation thereof.

In addition, the rubberized electronic tags adhere to the continuous band coming from the recirculation section with adhesion force smaller than the initial force, thus allowing a facilitated peeling and a greater flexibility in the selection of the pick-up point.

In one or more of the indicted aspects, the present invention can comprise one or more of the following characteristics.

Preferably the sliding speed of the continuous band along the first flat section is parallel to the sliding speed of the continuous band along the second flat section.

Preferably the first flat abutment surface is parallel to the second flat abutment surface.

The Applicant deems that such arrangement simplifies the structure of the apparatus and allows optimizing the operation thereof.

Preferably, in the passage from the first flat section to the recirculation section, said first rotation is equal to an angle of 90° or greater than 90° so as to make a partial reversal of the sliding speed.

The Applicant deems that such aspect optimises the passage of the rubberized electronic tags from the first flat section to the second flat section.

Preferably the second flat section terminates at a third transition line, downstream of which a recovery section of the continuous band starts, lacking rubberized electronic tags.

Preferably the action of overcoming said second adhesion force is carried out at said second flat section.

Preferably the action of overcoming said second adhesion force is carried out at said second flat section by means of the application device or a portion thereof which picks up the rubberized electronic tags from the second flat section.

The Applicant deems that the selection of operating a peeling at the second flat section, when the rubberized electronic tags are still adhered to the continuous band, even if with a smaller adhesion force, allows obtaining a high precision in gripping and hence in the subsequent positioning on the tyre being processed.

Preferably a third edge delimits, downstream the second flat abutment surface.

Preferably, in the passage from the second flat section to the recovery section, the rear surface of the continuous band is wound around a third edge delimiting the second flat abutment surface and defining the third transition line so that the direction of the sliding speed of the continuous band undergoes a third rotation.

Preferably, in the passage from the second flat section to the recovery section, said third rotation is equal to an angle of 90° or greater than 90°, making a partial reversal of the sliding speed. The Applicant deems that such aspect optimises the automated peeling of the rubberized electronic tags if the pick-up is not provided for directly from the second flat section.

Preferably, following said third rotation, the action of overcoming said second adhesion force is carried out at the third transition line so that the rubberized electronic tags are gradually peeled from the continuous band, which continues without rubberized electronic tags along the recovery section.

Preferably, following the peeling at the third transition line, the rubberized electronic tags adhere with a third adhesion force to a moving-away flat surface adjacent to the second flat abutment surface. Preferably, the third adhesion force is smaller than the first adhesion force and still more preferably is smaller than the second adhesion force.

Preferably said peeling device comprises a third abutment body having a moving-away flat surface in which said third edge is parallel to a fourth edge which delimits upstream the moving-away flat surface and which is adjacent to the third edge to form a further passage gap for the continuous band.

Preferably said moving-away flat surface is parallel to the second flat abutment surface.

The Applicant deems that such aspect optimises the automated peeling of the rubberized electronic tags if the pick-up is not directly provided for from the second flat section Preferably provision is made for overcoming said third adhesion force downstream of the third transition line.

Preferably, said action of overcoming said third adhesion force is carried out at said moving-away flat surface.

Preferably said action of overcoming said third adhesion force is carried out at said moving-away flat surface by means of the application device or a portion thereof which picks up the rubberized electronic tags from the moving-away flat surface.

The Applicant deems that the selection of operating a peeling at the moving-away flat surface allows obtaining a high precision in the pick-up due to the planar arrangement.

Preferably a greater surface of each rubberized electronic tag has a main size. Preferably said rubberized electronic tags are adhered to the front surface of the continuous band with said main size arranged transverse to the longitudinal direction of the continuous band. Still more preferably said rubberized electronic tags are adhered to the front surface of the continuous band with said main size arranged perpendicular to the longitudinal direction of the continuous band.

The Applicant has observed that a transverse arrangement of the rubberized electronic tags allows arranging reels containing a greater number of rubberized electronic tags with respect to a longitudinal arrangement. In accordance with one possible example, starting from a reel having 380 mm diameter, the transverse arrangement of the rubberized electronic tags allows arranging a number of rubberized electronic tags equal to about 3.5 times the number of rubberized electronic tags allowed by a longitudinal arrangement.

The greater number of rubberized electronic tags carries further advantages in terms of compactness and cycle time of the overall plant, of the present apparatus, and of the apparatus configured for generating the reels of continuous band carrying the rubberized electronic tags. In the above-described example, a transverse arrangement reduces, by four times, the number of reel changes in the apparatus configured for generating the reels of continuous band carrying the rubberized electronic tags and by 10 times the number of reel changes in the present apparatus.

In addition, the winding of the reel upstream of the peeling device deforms the rubberized electronic tags, curving them longitudinally since they tend to copy the circular profile of the reel. In a longitudinal arrangement, the deformation affects the main size of the greater surface while in a transverse arrangement the deformation affects the more limited size of the greater surface. A more extensive deformation (longitudinal arrangement) negatively impacts the process of application to the tyre and/or the operation of the electronic tag, thus making a transverse arrangement preferably, which minimises such deformation.

Preferably provision is made for threading said continuous band along said sliding path before imposing said longitudinal sliding motion. Preferably threading said continuous band comprises inserting said continuous band through a lateral access to the sliding path by a sliding motion transverse to the longitudinal direction of the continuous band.

Preferably said passage gap is open at least on one side in order to define a lateral access to the sliding path.

The Applicant has observed that the dimensions of the passage gap can make a longitudinal threading more difficult, and the Applicant has found that providing for a through lateral access simplifies the threading since it can be attained by a transverse sliding motion.

Preferably provision is made for opening said lateral access to the sliding path before threading said continuous band and reclosing said lateral access after having threaded said continuous band.

The Applicant deems that by providing for a lateral access that is reclosable during the operation of the apparatus, it is possible to improve the content of the continuous band and thus the precision in the sliding and in the automatic peeling of the rubberized electronic tags.

Preferably opening and reclosing said lateral access comprises moving a shutter stably associated with the sliding path.

Preferably provision is made for a shutter stably associated with the sliding path and movable for opening and closing said lateral access to the sliding path.

Preferably the shutter is stably hinged around a pin in order to rotate between a closed position, in which it closes the lateral access to the sliding path, and an open position in which it opens the lateral access to the sliding path.

The Applicant deems that an opening and closing system stably associated with the apparatus improves the safety of the apparatus itself.

Preferably, upstream of said first flat section, provision is made for unwinding from a reel said continuous band having the rubberized electronic tags.

Preferably said peeling device comprises an unwinding axis adapted to receive a reel of continuous band having the rubberized electronic tags. Preferably the unwinding axis is stopped and is configured for co-operating with the driving members of the continuous band in order to maintain a specific degree of tensioning.

The Applicant deems that the use of reels at the entrance to the apparatus reduces the bulk and simplifies the management of the changes.

Preferably, downstream of the second flat section, provision is made for winding in a reel the continuous band lacking rubberized electronic tags.

Preferably said peeling device comprises a winding axis adapted to receive a reel being formed of continuous band lacking rubberized electronic tags.

Preferably the driving members comprise the winding axis suitably motorized so as to drive the continuous band.

Preferably the driving members comprise one or more transmissions suitably motorized and/or adapted to carry out the function of stretcher of the continuous band.

The Applicant deems that the arrangement of reels at the outlet of the apparatus reduces the bulk and simplifies the management of the changes.

Preferably said first edge is arranged transverse to said longitudinal direction. Still more preferably said first edge is arranged perpendicular to said longitudinal direction.

Preferably said first transition line is arranged transverse to said longitudinal direction. Still more preferably said first transition line is arranged perpendicular to said longitudinal direction.

Preferably said second edge is arranged transverse to said longitudinal direction. Still more preferably said second edge is arranged perpendicular to said longitudinal direction.

Preferably said second transition line is arranged transverse to said longitudinal direction. Still more preferably said second transition line is arranged perpendicular to said longitudinal direction.

Preferably said third edge is arranged transverse to said longitudinal direction. Still more preferably said third edge is arranged perpendicular to said longitudinal direction.

Preferably the third transition line is arranged transverse to said longitudinal direction. Still more preferably the third transition line is arranged perpendicular to said longitudinal direction.

The Applicant deems that such transverse arrangement, in particular perpendicular, optimises the peeling of the rubberized electronic tags from the continuous band.

Preferably said first abutment body and said second abutment body are joined to form a single body having said first flat abutment surface and said second flat abutment surface peeled from a slit delimited by said first edge and said second edge and forming said passage gap.

Preferably, the distance between said first edge and said second edge is more than double the thickness of said continuous band. In such a manner, therefore, the sliding motion of the continuous band is allowed towards the recirculation section and from the recirculation section.

Preferably, the distance between said first edge and said second edge is smaller than a value comprised between 20% and 40% of the size of said rubberized electronic tag according to the longitudinal direction. In such a manner, it is advantageously allowed that the rubberized electronic tags, which are gradually peeled from the continuous band at the end of the first flat section, continue along the second flat section without being blocked in the passage gap.

Preferably, the width of said further passage gap is greater than the thickness of said continuous band. In such a manner, the sliding motion of the continuous band is allowed towards a recovery section of the continuous band lacking rubberized electronic tags.

Preferably, the width of said further passage gap is smaller than a value comprised between 20% and 40% of the size of said rubberized electronic tag according to the longitudinal direction upstream of said third edge. In such a manner, it is advantageously allowed that the rubberized electronic tags, which are gradually peeled from the continuous band at the end of the second flat section, continue along the moving-away flat surface without being blocked in the further passage gap.

Further characteristics and advantages will be clearer from the detailed description of a preferred but not exclusive embodiment of an apparatus for applying rubberized electronic tags to a tyre being processed, in which a method for applying rubberized electronic tags to a tyre being processed has application.

Such description will be set forth hereinbelow with reference to the enclosed drawings, provided as a non-limiting example in which:

FIG. 1 schematically shows, in a front view, an apparatus for applying rubberized electronic tags to a tyre being processed;

FIG. 5A shows an enlargement of the detail "X" of FIG. 5 in which the proportions were modified in order to better illustrate several aspects;

FIG. 7A shows an enlargement of the detail "Y" of FIG. 7 in which the proportions were modified in order to better illustrate several aspects;

Figure 1:
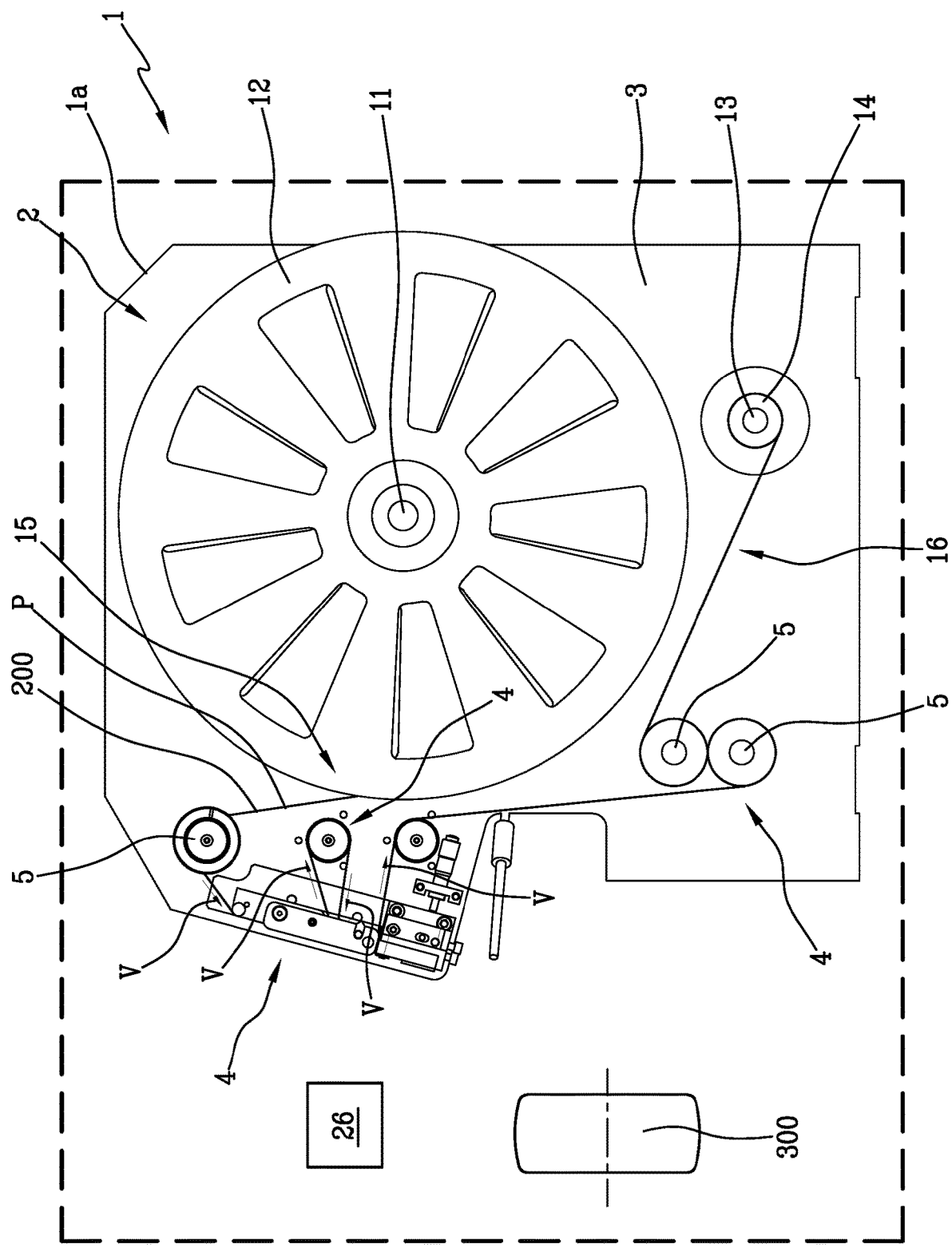
Figure 8:
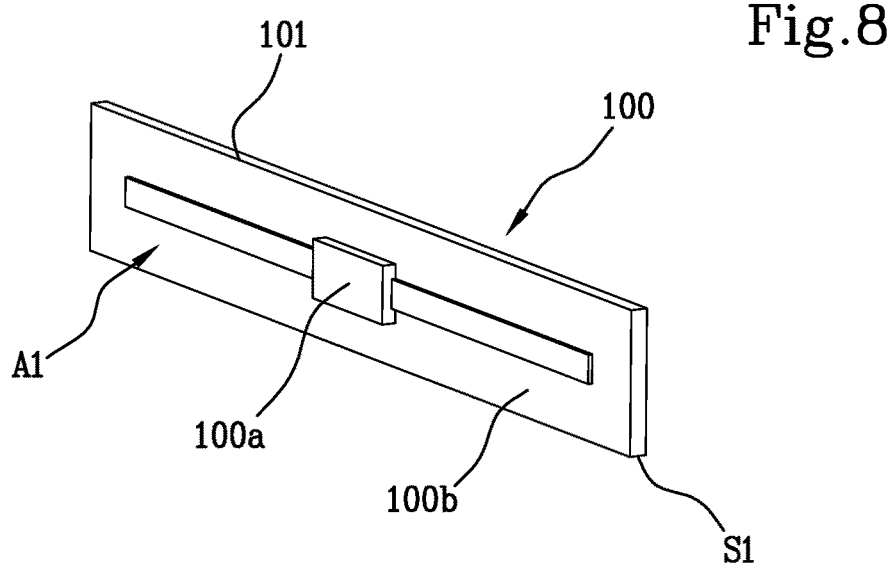
Figure 9:
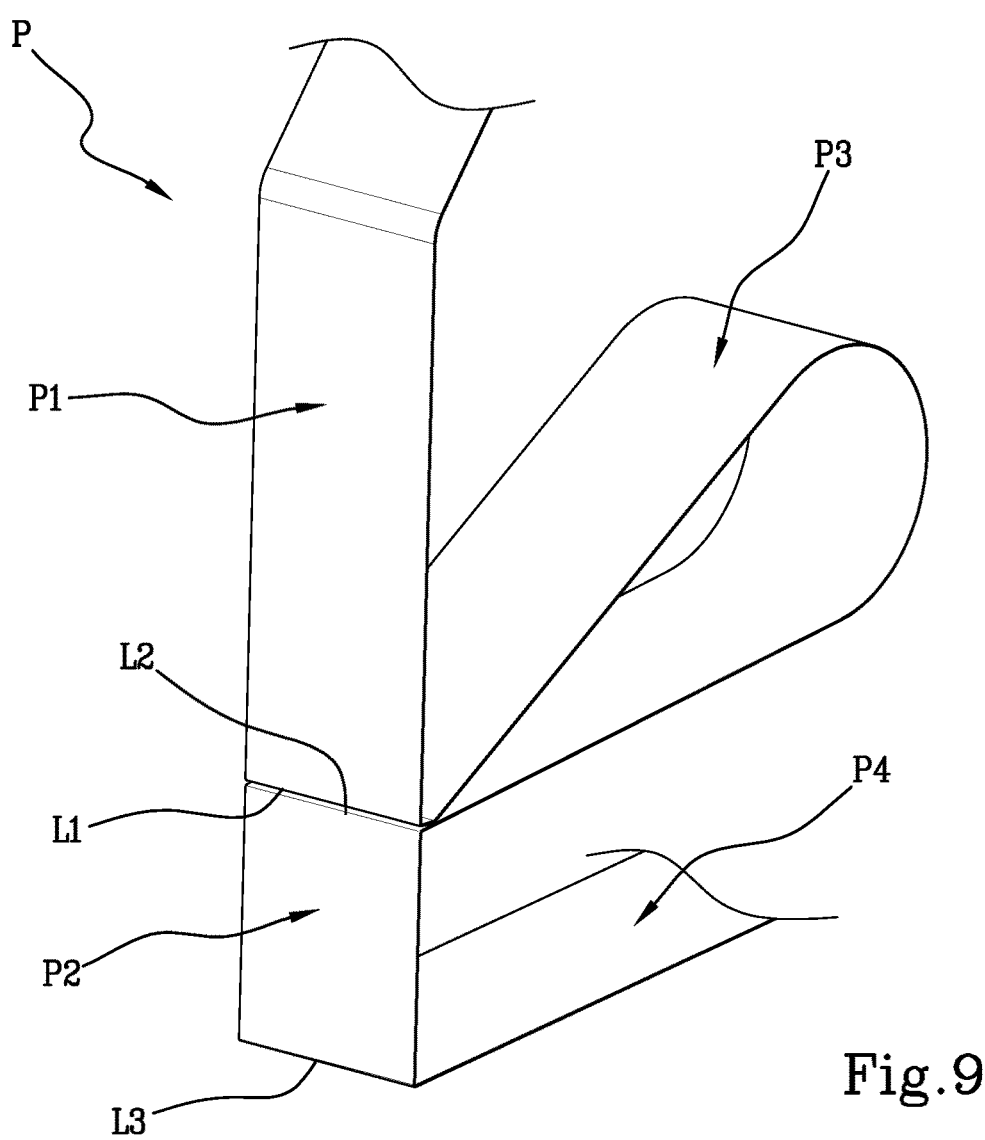

FIG. 8 schematically shows, in a perspective view, a rubberized electronic tag;

FIG. 9 schematically illustrates a portion of the sliding path of a continuous band in the apparatus of FIG. 1.

With reference to FIG. 1, reference number 1 indicates an apparatus for applying rubberized electronic tags to a tyre being processed, hereinbelow indicated as apparatus 1.

Figure 2:
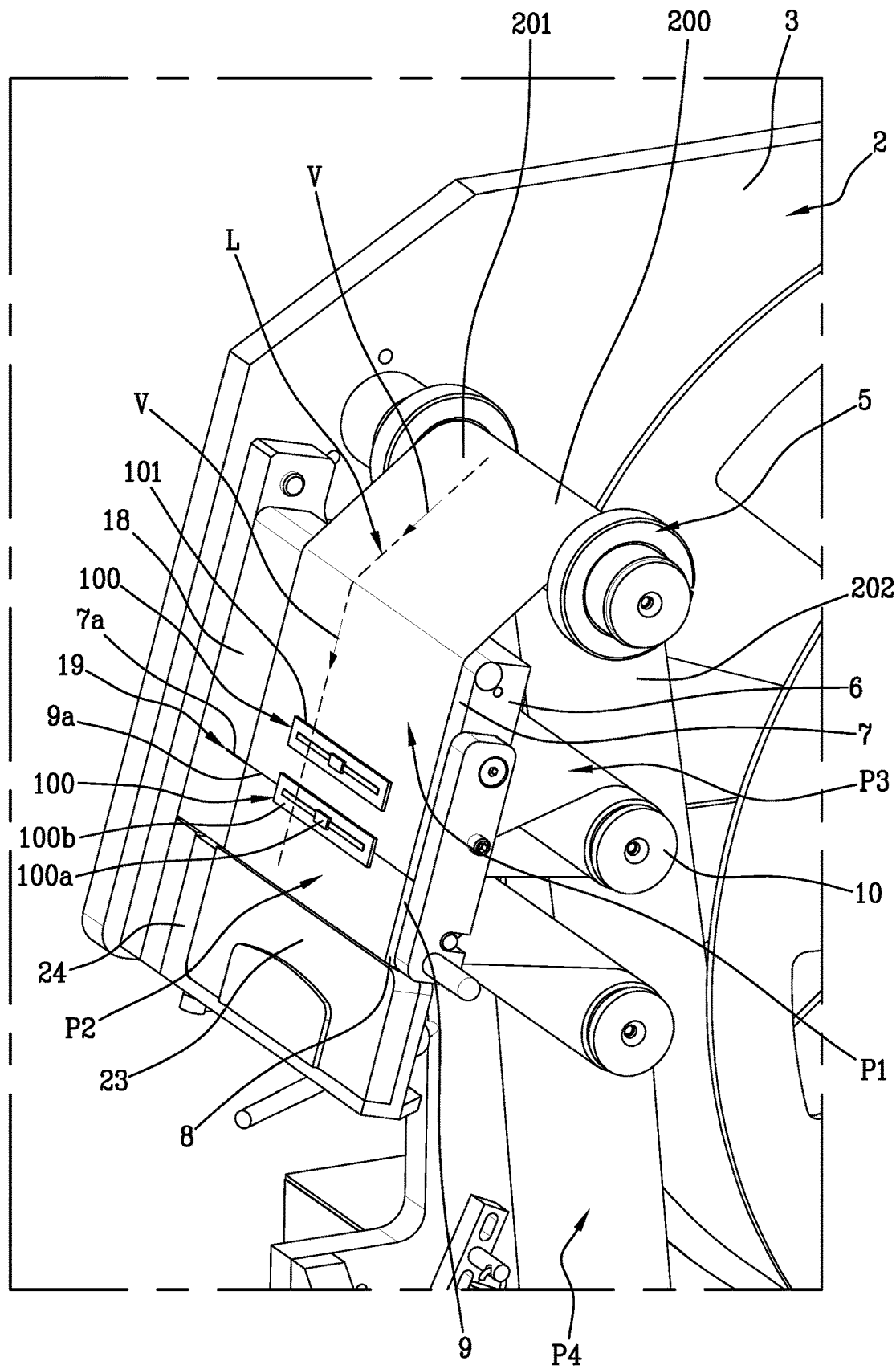
FIG. 2 shows an enlarged detail of FIG. 1 and in a perspective view.

With reference to FIG. 2 and to FIGS. 5-8, with 100 a rubberized electronic tag was indicated.

The rubberized electronic tags 100 are intended to be applied to a tyre and comprise a data storage unit, being part of a contactless identification and/or storage system, applied to or embedded in a thin rubber layer. For example, a rubberized electronic tag 100 comprises an electronic tag or transponder 100a of a radiofrequency identification and/or storage system (RFID) embedded in a thin rubber layer 100b.

With reference to FIG. 8, a rubberized electronic tag 100 has thickness S1 considerably smaller than the remaining dimensions so as to define a greater surface A1 preferably having rectangular shape. Preferably, the greater surface has a main size 101, i.e. one size greater than the other, approximately comprised between 40 mm and 110 mm, while the smaller size is approximately comprised between 5 mm and 25 mm. If the greater surface has rectangular shape, the main size 101 represents a long side thereof. In a preferred embodiment, the long side measures 70 mm and the corresponding short side measures 10 mm.

Reference number 200 overall indicates a continuous band made with a service material, for example a transparent plastic material, in particular PET. The continuous band 200 defines a support film for the rubberized electronic tags 100.

The continuous band 200 is extended lengthwise along a longitudinal direction "L" and has a front surface 201 and a rear surface 202 (FIG. 2). The front surface 201 and the rear surface 202 represent the surfaces of greater extension of the continuous band 200, which affect the entire length of the continuous band and have width comprised between 45 mm and 120 mm equal to the width of the continuous band itself. The thickness of the continuous band, intended as the distance between the front surface and the rear surface, i.e. as the size perpendicular to the front surface and to the rear surface, is comprised between 0.05 mm and 0.5 mm, preferably 0.15 mm.

The apparatus 1 comprises a peeling device 1a configured for peeling a rubberized electronic tag 100 from a continuous band 200. More preferably one at a time.

The apparatus 1 comprises an application device 26 configured for applying, to a tyre being processed 300, a rubberized electronic tag 100 peeled from the continuous band 200. The application device 26 can for example comprise one or more suckers adapted to act against the greater surface A1 of the rubberized electronic tags 100.

At the entrance to the peeling device 1a, the continuous band 200 carries a plurality of rubberized electronic tags 100 adhered with a first adhesion force to the front surface 201 of the continuous band and arranged sequentially along the longitudinal direction "L" of the continuous band itself. If the rubberized electronic tags 100 have a main size 101, preferably the rubberized electronic tags 100 are adhered to the front surface of the continuous band with the main size 101 arranged transversely, preferably perpendicularly, to the longitudinal direction "L" of the continuous band 200.

The peeling device 1a comprises a support structure 2 for example comprising a preferably vertical wall 3.

The peeling device 1a also comprises a set 4 of transmissions, for example mounted on the support structure 2. Preferably the set 4 of transmissions is projectingly extended from the wall 3.

The set 4 is schematically indicated in FIG. 1 and represents the set of the elements around which the continuous band 200 is arranged and which then defines a sliding path "P" for the continuous band 200 which, in the enclosed figures, is actually represented by the continuous band itself.

In accordance with one possible embodiment, for example illustrated in the enclosed figures, the set 4 comprises at least one transmission roller 5, preferably a plurality of transmission rollers distributed along the support structure 2.

Figure 5:
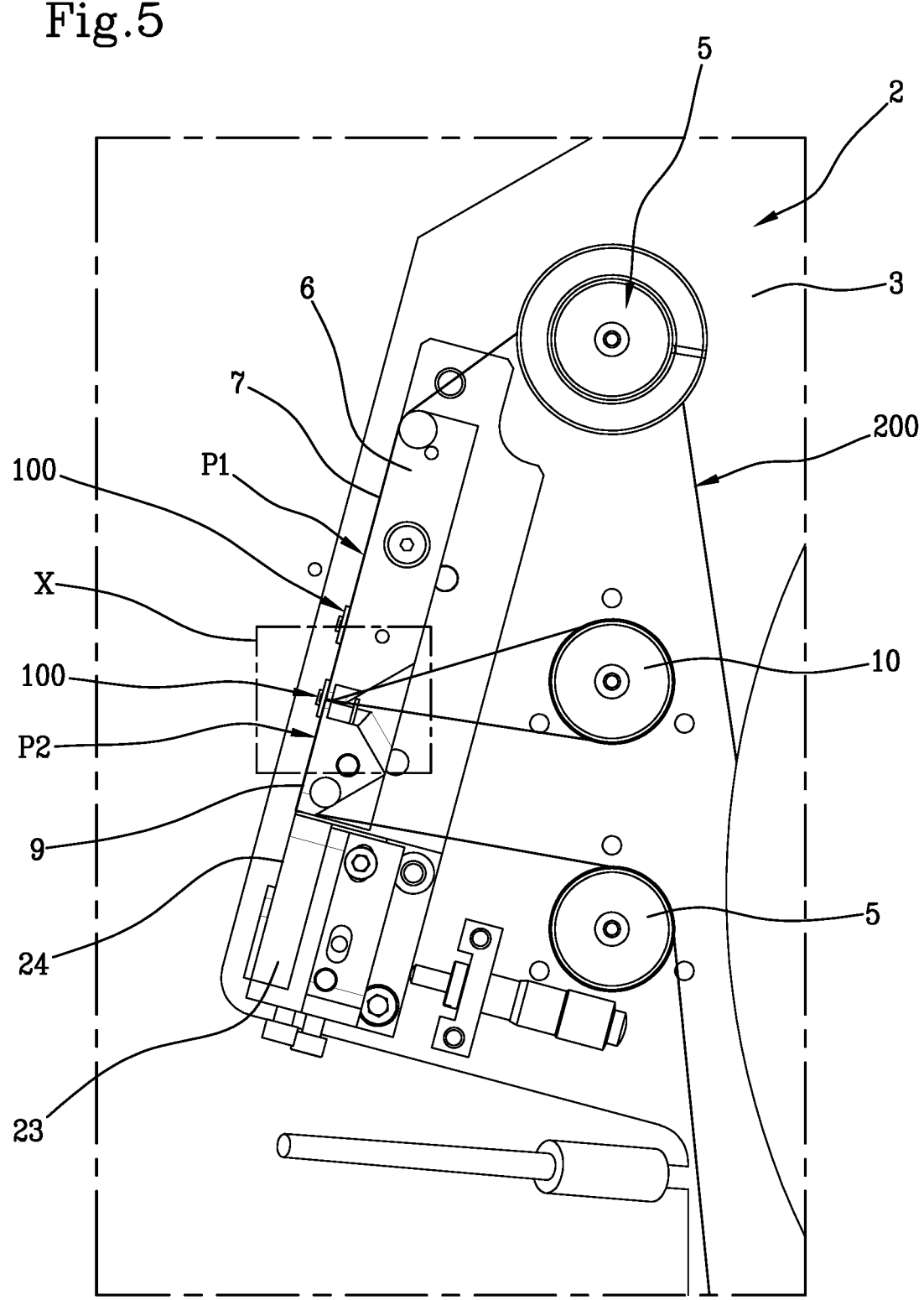
FIGS. 5-7 show the detail of FIG. 3 in which a part has been omitted in order to show other parts, respectively in three different operating conditions.
Figure 6:
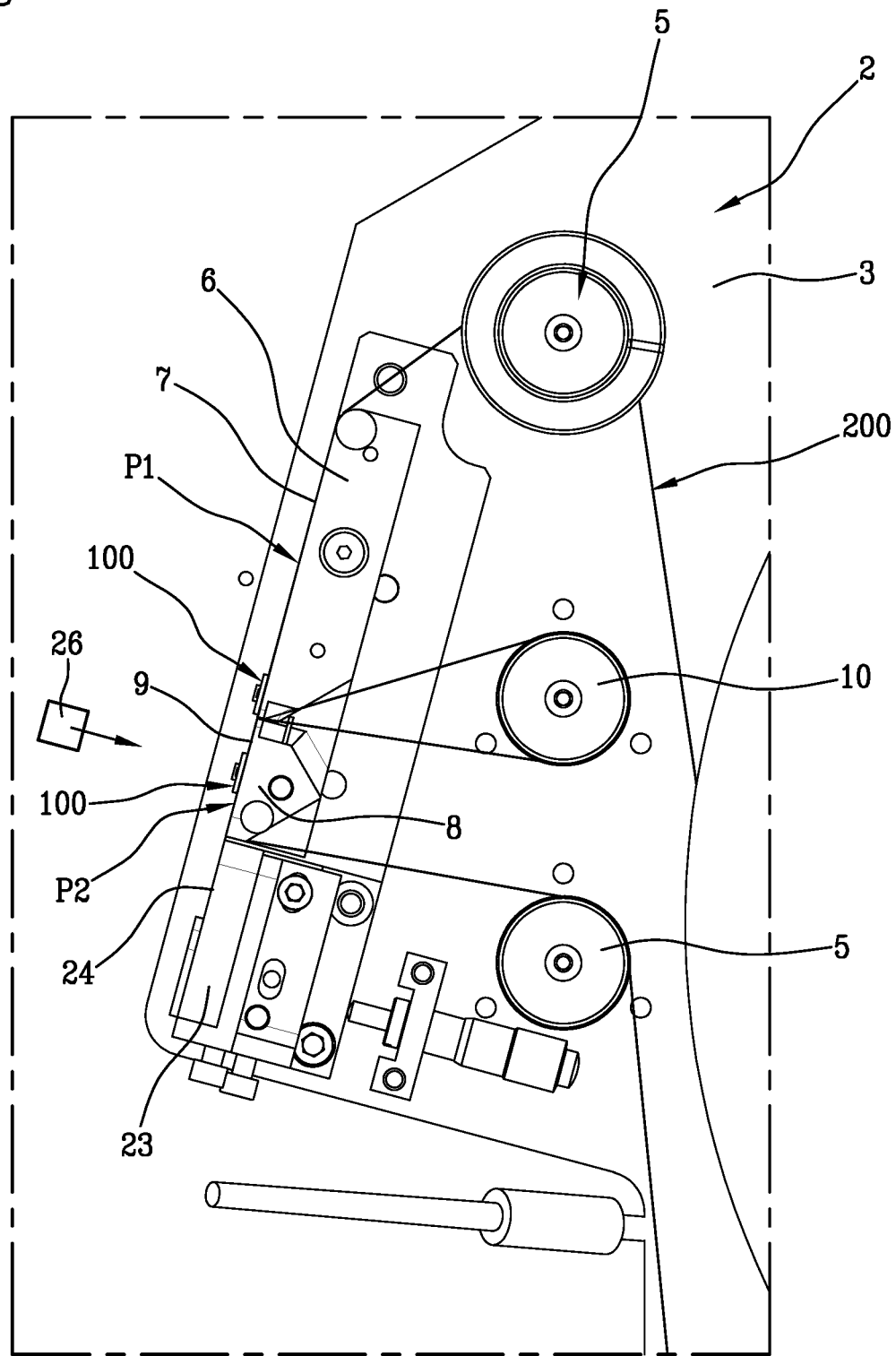
Figure 7:
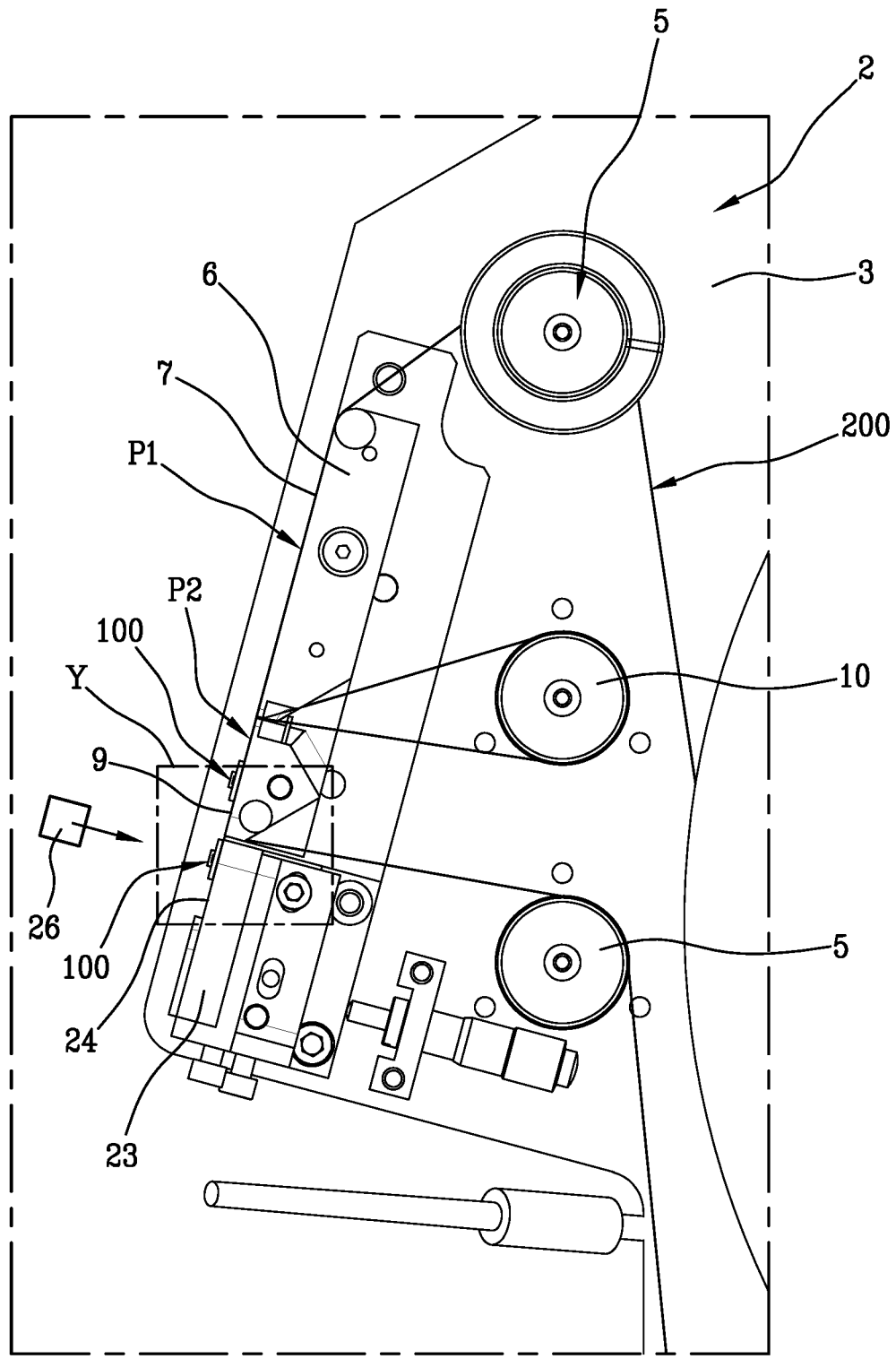

With reference for example to FIGS. 5-7, the set 4 comprises a first abutment body 6 having a first flat abutment surface 7, a second abutment body 8 having a second flat abutment surface 9 and a recirculation transmission 10, preferably attained as a further transmission roller, operatively interposed between the first abutment body 6 and the second abutment body 8.

In accordance with one possible embodiment, for example illustrated in FIG. 1, the peeling device 1a preferably comprises an unwinding axis 11 adapted to receive a reel 12 of continuous band 200 having the rubberized electronic tags 100.

In accordance with one possible embodiment, for example illustrated in FIG. 1, the peeling device 1a preferably comprises a winding axis 13 adapted to receive a reel 14 being wound of continuous band 200 lacking rubberized electronic tags 100.

The peeling device 1a comprises driving members configured for imposing, on the continuous band 200, a longitudinal sliding motion along the sliding path "P" with a sliding speed "V" with direction parallel to the longitudinal direction "L" (FIG. 1 and FIG. 2). The driving members can for example comprise the winding axis 13, suitably motorized, so as to drive the continuous band 200. In addition, the driving members can for example comprise one or more of the transmissions 5 that are suitably motorized and/or suitable for carrying out a function of stretcher of the continuous band 200.

Preferably the unwinding axis 11 is stopped and cooperates with the driving members of the continuous band 200 in order to maintain a specific level of tensioning of the continuous band 200. With reference for example to FIG. 1, the peeling device 1a comprises an inlet section 15 and an outlet section 16. The inlet section 15 is configured for being traversed, at the entrance to the sliding path "P", by the continuous band 200 carrying the plurality of rubberized electronic tags 100. The outlet section 16 is configured for being traversed, at the outlet from the sliding path "P", by the continuous band 200 lacking rubberized electronic tags 100.

The first flat abutment surface 7 is adapted to abuttingly receive the rear surface 202 of the continuous band 200 and defines a first flat section P1 of the sliding path "P".

The second flat abutment surface 9 is adapted to abuttingly receive the rear surface 202 of the continuous band 200 and defines a second flat section P2 of the sliding path "P".

The recirculation transmission 10 is arranged and/or configured so as to define a recirculation section P3 of the sliding path "P" along which the continuous band 200 coming from the first abutment body 6 is first deflected by rotating the direction of the sliding speed "V" and subsequently directed towards the second abutment body 8.

A first edge 7a delimiting downstream the first flat abutment surface 7 is parallel to a second edge 9a delimiting upstream the second flat abutment surface 9 and adjacent thereto to form a passage gap 17 for the continuous band 200 (FIG. 5A).

Preferably the first edge 7a and the second edge 9a are arranged transverse to the longitudinal direction "L", still more preferably are arranged perpendicular to the longitudinal direction "L".

Preferably the first flat abutment surface 7 is parallel to the second flat abutment surface 9.

The distance between the first edge 7a and the second edge 9a (i.e. the width of the passage gap 17) is more than double the thickness of the continuous band 200, having to allow the sliding motion of the continuous band 200 towards the recirculation section P3 and from the recirculation section P3. Preferably the distance between the first edge 7a and the second edge 9a (i.e. the width of the passage gap 17) is greater than 0.3 mm.

Said distance between the first edge 7a and the second edge 9a is also lower than a value preferably comprised between 20% and 40% of the size of the rubberized electronic tag 100 according to the advancing direction of the continuous band 200, i.e. according to the longitudinal direction "L". For example, in the case of rubberized electronic tag 100 of rectangular form having 70 mm×10 mm dimensions, arranged with its short side according to the longitudinal direction "L", said distance between the first edge 7a and the second edge 9a will be lower than a value comprised between 2 mm and 4 mm, for example lower than 3 mm. This in order to allow that, as will be better illustrated hereinbelow, the rubberized electronic tags 100 which are gradually peeled from the continuous band 200 at the end of the first flat section P1 continue along the second flat section P2 without being blocked in the passage gap 17.

As is for example illustrated in FIG. 2, the first abutment body 6 and the second abutment body 8 are preferably joined to form a single body 18 having the first flat abutment surface 7 and the second flat abutment surface 9 peeled from a slit 19 delimited by the first edge 7a and by the second edge 9a and forming the passage gap 17.

Figure 4:
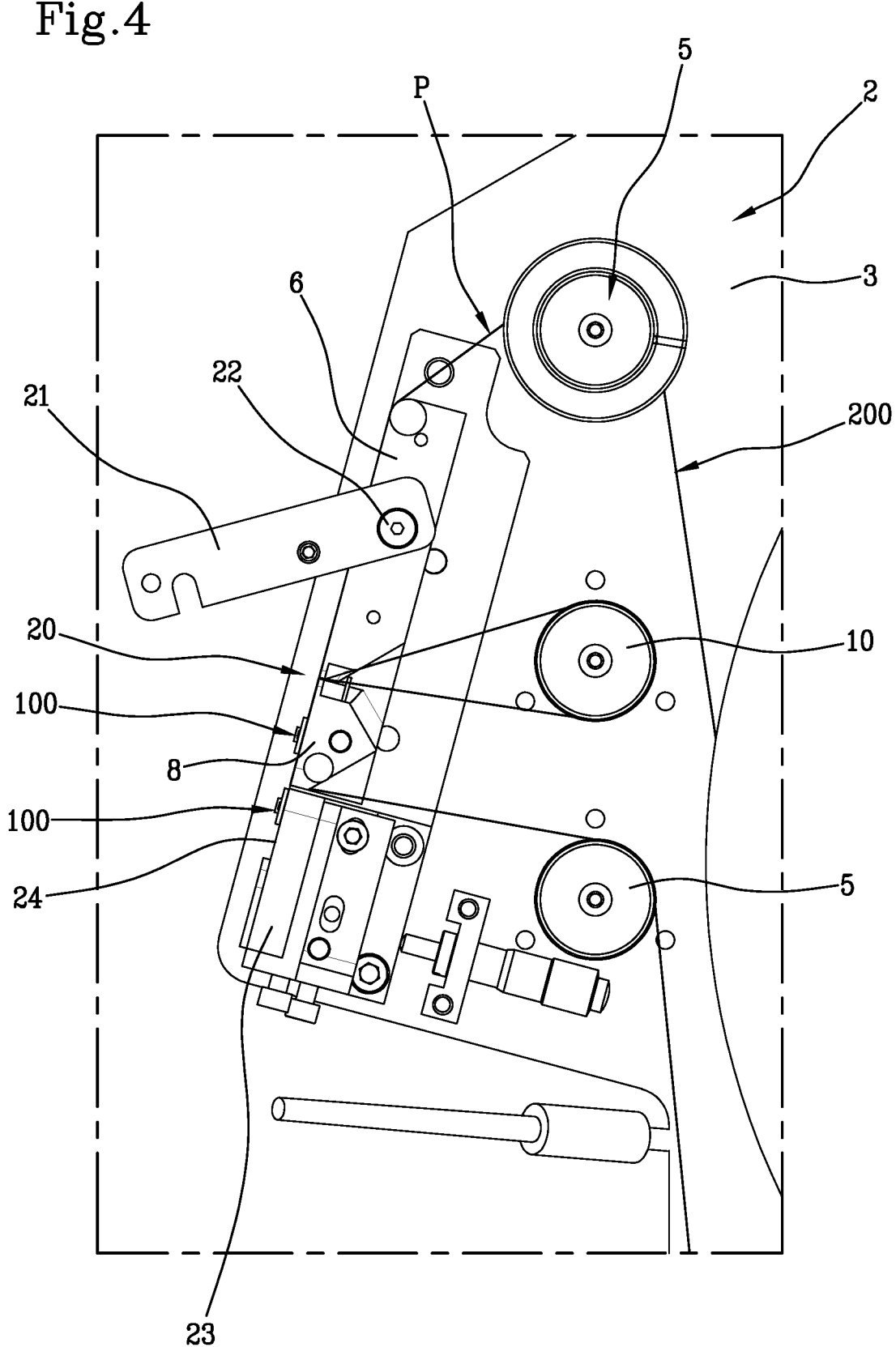
FIG. 4 shows the detail of FIG. 3 in a different operating configuration.

Preferably the passage gap 17 (e.g. the slit 19) is open at least on one side in order to define a lateral access 20 to the sliding path "P" (FIG. 4).

Figure 3:
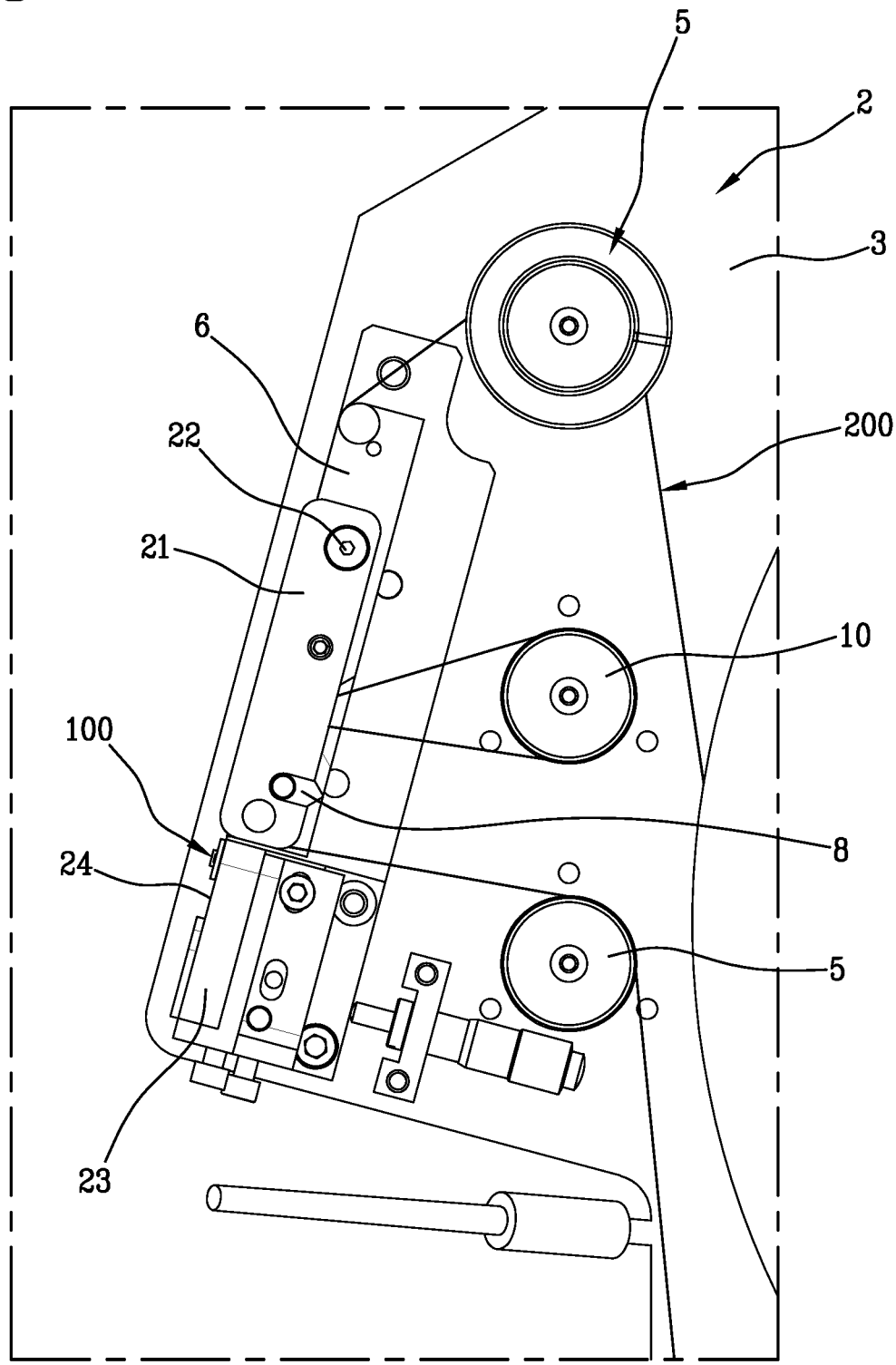
FIG. 3 shows an enlarged detail of FIG. 1.

Preferably the peeling device 1a comprises a shutter 21 stably associated with the sliding path "P" and movable for opening and closing the lateral access 20 to the sliding path "P". Preferably the shutter 21 is stably hinged around a pin 22 in order to rotate between a closed position, in which it closes the lateral access 20 to the sliding path "P" (FIG. 3) and an open position in which it opens the lateral access 20 to the sliding path "P" (FIG. 4).

Preferably a third edge 9b (FIG. 7A) delimits downstream the second flat abutment surface 9. Preferably the third edge 9b is arranged transverse to the longitudinal direction "L", preferably perpendicular to the longitudinal direction "L".

In accordance with one possible embodiment, for example illustrated in the enclosed figures, the peeling device 1a comprises a third abutment body 23 having a moving-away flat surface 24 adjacent to the second flat abutment surface 9.

The third edge 9b is parallel to a fourth edge 24a delimiting upstream the moving-away flat surface 24 and adjacent thereto to form a further passage gap 25 for the continuous band 200 (FIG. 7A). The width of the further passage gap 25 is greater than the thickness of the continuous band 200, having to allow the sliding motion of the continuous band 200 towards a recovery section P4 of the continuous band 200 lacking rubberized electronic tags 100. For example, the width of the further passage gap 25 is greater than 0.15 mm.

Said width of the further passage gap 25 is also lower than a value preferably comprised between 20% and 40% of the size of the rubberized electronic tag 100 according to the advancing direction of the continuous band 200, i.e. according to the longitudinal direction "L", upstream of the third edge 9b. For example, in the case of rubberized electronic tag 100 of rectangular form having 70 mm×10 mm dimensions, arranged with its short side according to the longitudinal direction "L", the width of the further passage gap will be lower than a value comprised between 2 mm and 4 mm, for example lower than 3 mm. This in order to allow that, as will be better illustrated hereinbelow, the rubberized electronic tags 100 which are gradually peeled from the continuous band 200 at the end of the second flat section P2 continue along the moving-away flat surface 24 without being blocked in the further passage gap 25. Preferably the moving-away flat surface 24 is parallel to the second flat abutment surface 9.

The apparatus 1 is configured for implementing a method for applying rubberized electronic tags 100 to a tyre being processed 300. The method provides for arranging the continuous band and the rubberized electronic tags 100 adhered with a first adhesion force to the front surface 201 of the continuous band 200 and arranged sequentially along the longitudinal direction "L" of the continuous band itself.

The continuous band 200 carrying the rubberized electronic tags 100 is introduced into the peeling device 1a in order to peel a rubberized electronic tag 100 from the continuous band 200. At the end of the peeling provision is made for applying to a tyre being processed 300 a rubberized electronic tag 100 peeled from the continuous band 200.

In order to peel the rubberized electronic tags 100 from the continuous band 200 provision is preferably made for introducing, in the peeling device 1a, a reel 12 in which the continuous band 200 carrying the rubberized electronic tags 100 is wound in coils. In this case, provision is therefore made for unwinding, from the reel 12, the continuous band 200 having the rubberized electronic tags 100.

The longitudinal sliding motion having the sliding speed "V", with direction parallel to the longitudinal direction "L" of the continuous band 200, is set for the continuous band 200. The sliding continuous band 200 is set to follow the sliding path "P" comprising at least the first flat section P1, the recirculation section P3 and the second flat section P2.

The first flat section P1 terminates at a first transition line L1 (FIG. 9) defined by the first edge 7a delimiting the first flat abutment surface 7. As with the first edge 7a, also the first transition line L1 is preferably arranged transverse to the longitudinal direction "L", still more preferably perpendicular to the longitudinal direction "L". The recirculation section P3 starts at the first transition line L1 and terminates at a second transition line L2 (FIG. 9) parallel and adjacent to the first transition line L1 to form the passage gap 17.

The second transition line L2 is defined by the second edge 9a delimiting the second flat abutment surface 9. Like the second edge 9a, also the second transition line L2 is preferably arranged transverse to the longitudinal direction "L", still more preferably perpendicular to the longitudinal direction "L".

The second flat section P2 starts at the second transition line L2 and terminates at a third transition line L3, downstream of which a recovery section P4 starts of the continuous band 200 lacking rubberized electronic tags 100. The third transition line L3 is defined by the third edge 9b delimiting downstream the second flat abutment surface 9. Like the third edge 9b, also the third transition line L3 is preferably arranged transverse to the longitudinal direction "L", still more preferably perpendicular to the longitudinal direction "L".

Preferably provision is made for winding in a reel 14 the continuous band 200 lacking rubberized electronic tags 100 downstream of the second flat section P2, preferably at the end of the recovery section P4.

Along the first flat section P1, the rear surface 202 of the continuous band 200 slides in abutment against the first flat abutment surface 7 with sliding speed "V" parallel to the first flat abutment surface 7. Along the second flat section P2, the rear surface 202 of the continuous band 200 slides in abutment against the second flat abutment surface 9 with sliding speed "V" parallel to the second flat abutment surface 9. Preferably, the sliding speed "V" of the continuous band 200 along the first flat section P1 is parallel to the sliding speed "V" of the continuous band 200 along the second flat section P2.

In the passage from the first flat section P1 to the recirculation section P3, the rear surface of the belt 202 is wound around the first edge 7a delimiting the first flat abutment surface 7 so that the direction of the sliding speed "V" of the continuous band 200 undergoes a first rotation, preferably greater than or equal to 90°. If the first rotation is greater than 90°, one obtains a partial reversal of the sliding speed "V".

In the passage from the recirculation section P3 to the second flat section P2, the rear surface 202 of the continuous band 200 is wound around the second edge 9a delimiting the second flat abutment surface 9 so that the direction of the sliding speed "V" of the continuous band 200 undergoes a second rotation.

In the passage from the second flat section P2 to the recovery section P4, the rear surface 202 of the continuous band 200 is wound around the third edge 9b delimiting the second flat abutment surface 9 and defining the third transition line L3 so that the direction of the sliding speed "V" of the continuous band 200 undergoes a third rotation, preferably greater than or equal to 90°. If the third rotation is greater than 90°, a partial reversal of the sliding speed "V" is attained.

At the first transition line L1, the rubberized electronic tags 100 are gradually peeled from the continuous band 200 (FIG. 6), due to the first rotation sustained by the direction of the sliding speed "V", and continue starting from the second transition line L2 along the second flat section P2 adhering with a second adhesion force, smaller than the first adhesion force, to the front surface 201 of the continuous band 200 which is moving along the second flat section P2 arriving from the recirculation section P3.

Starting from the first transition line L1, the continuous band 200 continues, lacking rubberized electronic tags 100, along the recirculation section P3.

Preferably provision is made for overcoming downstream of the second transition line L2 the second adhesion force in order to definitively move the rubberized electronic tags 100 away from the continuous band 200. Preferably the action of overcoming the second adhesion force is carried out at the second flat section P2.

Preferably the action of overcoming the second adhesion force is carried out by the application device 26 or a portion thereof which picks up the rubberized electronic tags 100 from the second flat section P2.

As an alternative, the action of overcoming the second adhesion force occurs following the third rotation sustained by the sliding speed "V" at the third transition line L3. In other words, the passage of the continuous band 200 through the third transition line L3 causes the gradual peeling of the rubberized electronic tags from the continuous band itself which continues without rubberized electronic tags along the recovery section P4.

Preferably, following the peeling at the third transition line L3 the rubberized electronic tags 100 adhere with a third adhesion force to the moving-away flat surface 24, being definitively moved away from the continuous band 200. The third adhesion force is smaller than the first adhesion force, preferably it is smaller than the second adhesion force.

Preferably provision can also be made for overcoming the third adhesion force downstream of the third transition line L3 in order to pick up the rubberized electronic tags 100.

Preferably the action of overcoming the third adhesion force occurs at the moving-away flat surface 24, i.e. provision can be made for picking up the rubberized electronic tags 100 from the moving-away flat surface 24, for example by the application device 26 or a portion thereof. In this case, the rubberized electronic tags 100 follow the entire the second flat section P2 and, at the third transition line L3, are gradually peeled from the continuous band 200 (FIG. 7), due to the third rotation sustained by the direction of the sliding speed "V" and, following their peeling at the third transition line L3, adhere to the moving-away flat surface 24 adjacent to the second flat abutment surface 9. The continuous band 200 continues, lacking rubberized electronic tags 100, along the recovery section P4.

Preferably provision is made for threading the continuous band 200 along the sliding path "P" before imposing the longitudinal sliding motion. In this case provision is made for inserting the continuous band 200 through the lateral access 20 of the sliding path "P" by a sliding motion transverse to the longitudinal direction "L" of the continuous band 200.

Preferably, the lateral access 20 is opened before threading the continuous band 200 and re-closed after having threaded the continuous band 200, for example by moving the shutter 21.

The invention claimed is:

1. A method for applying rubberized electronic tags to a tyre being processed, comprising:
    arranging a continuous band and a plurality of rubberized electronic tags, wherein the continuous band is extended lengthwise along a longitudinal direction and has a front surface and a rear surface and wherein the rubberized electronic tags are adhered with a first adhesion force to the front surface of the continuous band and are arranged sequentially along the longitudinal direction of the continuous band,
    peeling a rubberized electronic tag from the continuous band and,
    applying, to a tyre being processed, said rubberized electronic tag peeled from the continuous band,
wherein the peeling said rubberized electronic tag from the continuous band comprises:
    imposing, on said continuous band, a longitudinal sliding motion having a sliding speed with direction parallel to said longitudinal direction, and
    imposing, on said sliding continuous band, a sliding path (P) comprising at least one first flat section, a recirculation section and a second flat section,
wherein the first flat section ends at a first transition line, wherein the recirculation section starts at the first transition line and ends at a second transition line parallel and adjacent to the first transition line to form a passage gap for the continuous band, and wherein the second flat section starts at the second transition line,
wherein, along the first flat section, the rear surface of the continuous band slides in abutment against a first flat abutment surface with sliding speed with direction parallel to said first flat abutment surface,
wherein, in a passage from the first flat section to the recirculation section, the rear surface of the continuous band is wound around a first edge delimiting the first flat abutment surface and defining the first transition line so that the direction of the sliding speed of the continuous band undergoes a first rotation,
wherein, in a passage from the recirculation section to the second flat section, the rear surface of the continuous band is wound around a second edge delimiting a second flat abutment surface defining the second transition line so that the direction of the sliding speed of the continuous band undergoes a second rotation, and
wherein, along the second flat section, the rear surface of the continuous band slides in abutment against the second flat abutment surface with sliding speed with direction parallel to said second flat abutment surface,
so that, following said first rotation at the first transition line, the rubberized electronic tags are gradually peeled from the continuous band, the continuous band continuing without rubberized electronic tags along the recirculation section, and continuing starting from the second transition line along the second flat section, adhering with a second adhesion force, smaller than the first adhesion force, to the front surface of the continuous band moving along the second flat section arriving from the recirculation section,
the method further comprising
    overcoming, downstream of the second transition line, the second adhesion force, in order to definitively move the rubberized electronic tags away from the continuous band.

2. The method according to claim 1, wherein the sliding speed of the continuous band along the first flat section has a direction that is parallel to a direction of the sliding speed of the continuous band along the second flat section.

3. The method according to claim 1, wherein in the passage from the first flat section to the recirculation section, said first rotation is on an angle equal to or greater than 90° to provide a partial reversal of the sliding speed.

4. The method according to claim 1, wherein, the second flat section ends at a third transition line, downstream of which a recovery section starts for the continuous band lacking rubberized electronic tags.

5. The method according to claim 4, wherein the third transition line is arranged transverse to said longitudinal direction.

6. The method according to claim 4, wherein the overcoming said second adhesion force is performed at said second flat section.

7. The method according to claim 4, wherein, in the passage from the second flat section to the recovery section, the rear surface of the continuous band is wound around a third edge delimiting the second flat abutment surface and defining the third transition line so that the direction of the sliding speed of the continuous band undergoes a third rotation.

8. The method according to claim 7, wherein, in the passage from the second flat section to the recovery section, said third rotation is equal to or greater than an angle of 90°, providing a partial reversal of the sliding speed.

9. The method according to claim 7, wherein following said third rotation, the overcoming said second adhesion force is performed at the third transition line so that the rubberized electronic tags are gradually peeled from the continuous band, the continuous band continuing without rubberized electronic tags along the recovery section.

10. The method according to claim 9, wherein following the peeling at the third transition line, the rubberized electronic tags adhere with a third adhesion force to a moving-away flat surface adjacent to the second flat abutment surface.

11. The method according to claim 10, comprising overcoming said third adhesion force downstream of the third transition line.

12. The method according to claim 11, wherein said overcoming said third adhesion force is performed at said moving-away flat surface.

13. The method according to claim 1, wherein a greater surface of each rubberized electronic tag has a main size and wherein said rubberized electronic tags are adhered to the front surface of the continuous band with said main size arranged transverse to the longitudinal direction of the continuous band.

14. The method according to claim 1, comprising threading said continuous band along said sliding path before imposing said longitudinal sliding motion, and wherein threading said continuous band comprises inserting said continuous band through a lateral access to the sliding path by a sliding motion transverse to the longitudinal direction of the continuous band.

15. The method according to claim 14, comprising opening said lateral access to the sliding path before threading said continuous band and reclosing said lateral access after having threaded said continuous band.

16. The method according to claim 15, wherein opening and reclosing said lateral access comprises moving a shutter stably associated with the sliding path.

17. The method according to claim 1, comprising, upstream of said first flat section, unwinding from a reel said continuous band having the rubberized electronic tags.

18. The method according to claim 1, comprising, downstream of the second flat section, winding in a reel the continuous band lacking rubberized electronic tags.

19. The method according to claim 1, wherein said first edge and said first transition line are arranged transverse to said longitudinal direction.

20. The method according to claim 1, wherein said second edge and said second transition line are arranged transverse to said longitudinal direction.

* * * * *